United States Patent
Brown

(10) Patent No.: US 6,306,952 B1
(45) Date of Patent: Oct. 23, 2001

(54) COATING METHOD AND COATING COMPOSITION USED THEREIN

(75) Inventor: Ward Thomas Brown, North Wales, PA (US)

(73) Assignee: Rohm and Haas Company, Philadelphia, PA (US)

( * ) Notice: Subject to any disclaimer, the term of this patent is extended or adjusted under 35 U.S.C. 154(b) by 0 days.

(21) Appl. No.: 09/497,472

(22) Filed: Feb. 3, 2000

Related U.S. Application Data

(62) Division of application No. 09/108,142, filed on Jun. 30, 1998, now Pat. No. 6,027,763.
(60) Provisional application No. 60/051,660, filed on Jul. 3, 1997.

(51) Int. Cl.$^7$ .................................................. C08L 75/60
(52) U.S. Cl. ..................... 524/507; 524/502; 524/513; 524/514
(58) Field of Search .................................. 524/507, 502, 524/513, 514

(56) References Cited

U.S. PATENT DOCUMENTS

| | | |
|---|---|---|
| 4,155,892 | 5/1979 | Emmons et al. . |
| 4,351,754 | 9/1982 | Dupre . |
| 4,395,524 | 7/1983 | Emmons et al. . |
| 5,066,710 | 11/1991 | Simonet et al. . |
| 5,071,900 | 12/1991 | Page et al. . |
| 5,403,393 | 4/1995 | Dubble . |
| 5,521,235 | 5/1996 | Redelius . |
| 5,672,379 | 9/1997 | Schall et al. . |
| 5,811,477 | 9/1998 | Burris et al. . |

FOREIGN PATENT DOCUMENTS

0721003 A2   7/1996   (EP) .

*Primary Examiner*—Edward J. Cain

(57) ABSTRACT

The present invention is directed to a method of coating a substrate under ambient conditions by conventional single step application means, such as single spray heads with a single pack fast dry paint, containing a coating composition of the present invention, which contains a latex binder, an associative thickener and a water soluble organic volatile solvent. The amounts the associative thickener and the solvent are such that the paint has an in-can viscosity under ambient conditions in the range of from 1,000 cps to 6,000 cps and a set-to-touch dry time rating under ASTM D-1640 of less than 10 minutes. The method of the present invention and coating composition used therein can be used to produce a quick drying coating useful as, a pavement or road marking traffic paint for concrete, asphalt or bituminous roads, walkways, or parking lots.

11 Claims, No Drawings

COATING METHOD AND COATING COMPOSITION USED THEREIN

This application is a divisional 09/108,142 filed Jun. 30, 1998 now U.S. Pat. No. 6,027,763 which claims benefit to Provisional Application No. 60/051,660 filed Jul. 3, 1997.

FIELD OF INVENTION

This invention is concerned with coating compositions having a low VOC content and which are quick to dry but easy to apply, their preparation and use.

BACKGROUND OF THE INVENTION

It has long been desired to reduce both the drying time of coating compositions, especially for use as traffic paints, and, for environmental reasons, the content of volatile organic components (VOC) in them (The permissible amount of VOC that can be released in the air in the United States from traffic paints is expected to drop to less than 150 grams of VOC per liter of paint). However these two attributes are in conflict because replacing VOC with water generally increases drying time, especially under ambient high humid conditions, which typically vary in the range of from 65 percent to 90 percent.

Improving the drying speed of aqueous compositions has been attempted, e.g. in EP-A 7210003, by adopting a two-stage approach wherein a layer of aqueous polymer is first applied, followed immediately by the application of thickener to accelerate its drying. However this approach is cumbersome and the two-stage, twin pack approach it demands fails to meet the third desirable attribute of coating compositions, namely that they be easy to apply.

This invention addresses the problem of reducing the VOC content of coating compositions which remain quick to dry and easy to apply in a single step by conventional single stage application means, such as air-atomized spray, airless spray, air-assisted airless spray, and high volume low pressure spray.

STATEMENT OF THE INVENTION

The present invention is directed to a method of coating a substrate comprising:
applying under ambient conditions on the surface of said substrate a layer of a single pack fast dry paint containing a low VOC waterborne coating composition, said composition comprising a latex binder, an associative thickener and a water soluble organic volatile solvent, wherein the amounts said associative thickener and said solvent are such that said paint has an in-can viscosity under ambient conditions in the range of from 1,000 cps to 6,000 cps and a set-to-touch dry time rating under ASTM D-1640 of less than 10 minutes; and
evaporating said solvent from said layer to form said coating on said substrate.

The present invention is also directed to a method of improving drying time of a traffic marking on a road or pavement surface comprising:
applying said surface a layer of a single pack traffic paint containing a low VOC waterborne coating composition comprising a latex binder, an associative thickener in the range of from 0.01 percent to 10 percent, and a water soluble organic volatile solvent in the range of from 0.2 percent to 10 percent, all in volume percentages based on the total volume of the composition, wherein said traffic paint has an in-can viscosity under ambient conditions in the range of from 1,000 cps to 6,000 cps and a set-to-touch dry time rating under ASTM D-1640 of less than 10 minutes;
evaporating said solvent from said layer to form said traffic marking on said substrate.

The present invention is further directed to a fast dry low VOC single pack waterborne coating composition comprising:
a latex binder;
an associative thickener in the range of from 0.01 percent to 10 percent; and
a water soluble organic volatile solvent in the range of from 0.2 percent to 10 percent, all in volume percentages based on the total volume of the composition, wherein a traffic paint containing said composition has an in-can viscosity under ambient conditions in the range of from 1,000 cps to 6,000 cps and a set-to-touch dry time rating under ASTM D-1640 of less than 10 minutes.

One of the advantage of the present invention is that it provides a composition with sufficiently low in-can viscosity, so that a paint prepared therefrom can be easily sprayed by conventional single head traffic paint application devices.

Yet another advantage is that a layer of a paint containing the composition of the present invention dries at a faster rate than a layer conventional waterborne paints even under high humidity conditions.

DETAILED DESCRIPTION OF THE INVENTION

As used herein:

"GPC weight average molecular weight" means the molecular weight of a polymer determined by gel permeation chromatography (GPC), using a differential refractometer as a detector. A set of 3 GPC columns packed with styrene/divinyl benzene beads having pore sizes in the range 100 to 10,000 angstroms, are typically used during the analysis. Generally the solvent used is tetrahydrofuran (THF), flowing at a rate of 1.0 ml/min. through the GPC columns. The temperature of the columns is usually maintained at 40° C.

The instrument, such as the one supplied by Polymer Laboratories, Amherst, Mass. and American Polymer Standards Co., Mentor, Oh. is first calibrated for molecular weight using narrow distribution polystyrene or a polymethacrylate standards. The weight average molecular weight of the sample is then determined by using the following equation:

$$\text{Weight average molecular weight } (M_w) = \Sigma(R \times M)/\Sigma H$$

where R is the detector response measured above baseline at a given time and M is the molecular weight at that time, as determined from the calibration logarithm. The summation is made for the elution time at peak start to the elution time at peak end. This summation is the number reported as the weight average molecular weight. Further details of gel permeation chromatography (GPC) are found at page 4, Chapter I of The Characterization of Polymers published by Rohm and Haas Company, Philadelphia, Pa. in 1976.

"Glass transition temperature (Tg)" is a narrow range of temperature, as measured by conventional differential scanning calorimetry (DSC), during which amorphous polymers change from relatively hard brittle glasses to relatively soft viscous rubbers. To measure the Tg by this method, the copolymer samples were dried, preheated to 120° C., rapidly cooled to −100° C., and then heated to 150° C. at a rate of 20° C./minute while data was being collected. The Tg was measured at the midpoint of the inflection using the half-height method.

"Latex binder" means "Dispersed polymer", "Solubilized polymer" (both defined below), or a mixture thereof.

"Dispersed polymer" means particles of polymer, which are colloidally dispersed and stabilized in an aqueous medium.

"Solubilized polymer" includes "Water soluble polymer", "Water reducible polymer" or a mixture thereof Water soluble polymer means a polymer dissolved in an aqueous medium. Water reducible polymer means a polymer dissolved in water and water miscible solvent. Solubilized polymer results in a polymer solution characterized by having the self-crowding constant (K) of the Money equation $[1/\ln_{hrel}=1/BC-K/2.5]$ equal to zero. By contrast, dispersed polymer has (K) equal to 1.9. The details of Money equation are disclosed in an article entitled "Physical Characterization of Water Dispersed and Soluble Acrylic Polymers" by Brendley et al., in "Nonpolluting Coatings and Coating Processes" published by Plenum Press, 1973 and edited by Gordon and Prane.

"Polymer particle size" means the diameter of the polymer particles measured by using a Brookhaven Model BI-90 Particle Sizer supplied by Brookhaven Instruments Corporation, Holtsville, N.Y., which employs a quasi-elastic light scattering technique to measure the size of the polymer particles. The intensity of the scattering is a function of particle size. The diameter based on an intensity weighted average is used. This technique is described in Chapter 3, pages 48–61, entitled Uses and Abuses of Photon Correlation Spectroscopy in Particle Sizing by Weiner et al. in 1987 edition of American Chemical Society Symposium series.

"Polymer solids" means polymer in its dry state.

"(meth)acrylate" includes acrylate and methacrylate.

"In-can viscosity" is the viscosity of a paint at the moment of application, such as at the time of spraying of the paint on the surface of a substrate.

Normally, the presence of an associative thickener in a coating composition tends to increase the in-can viscosity of a paint containing such a composition to a level where it becomes very difficult to apply the paint by conventional application means. Applicant has unexpectedly discovered that by adjusting the amount of the associative thickener and by adding a water soluble volatile organic solvent to the composition at a certain unexpected level, one can achieve an in-can viscosity sufficiently low to render the paint sprayable by conventional spraying means while drying rapidly upon application over a substrate. The viscosity of a paint containing the composition of the present invention, as measured at ambient temperature by Brookfield Model LVT Viscometer supplied by Brookfield Engineering Laboratories INC., Stoughton, Mass., (#3 spindle @ 30 RPM), varies in the range of from 1,000 to 6,000, preferably 1000 to 3500 centipoise (cps). If the viscosity exceeds the upper limit, it becomes very difficult to spray the paint by conventional single step spray application means. If the viscosity drops below the lower limit, it would take too long for a layer from the paint to dry.

It is believed that the associative thickener in the waterborne composition increases the viscosity of a waterborne coating composition in part by forming a network of thickener molecules and polymer particles. This network is formed by the association of the thickener hydrophobes with themselves and with the surface of the polymer particles. Water soluble organic volatile solvents tend to solvate these hydrophobic segments and decrease their tendency to associate, thereby inhibiting the ability of the thickener to increase the viscosity of the coating. When a layer from a paint containing the composition of the present invention is applied over a substrate surface, the volatile water-soluble organic solvent rapidly evaporates, and the thickener's hydrophobic segments begin to associate, causing the viscosity to increase. Thus, if sufficient amount of the thickener is used, the final viscosity will be high enough for the layer to dry and set rapidly into a coating.

The amount of the associative thickener added to the composition is such that a freshly applied layer from a paint containing the composition would have an upper set-to-touch dry time rating when measured under ASTM D 1640 of less than 10 minutes, preferably less than 8 minutes and most preferably less than 5 minutes. The ASTM D 1640 test is conducted at an ambient temperature in the range of from 20° C. to 23° C. and 50±2% relative humidity for a film of 0.305 mm (12 mil) wet film thickness. The lower set-to-touch dry time rating under the ASTM D 1640 test is 10 seconds. Applicant has unexpectedly discovered that by adjusting the amount of the associative thickener added to the composition, the foregoing set-to-dry time rating for the paint containing the coating composition of the present invention can be obtained by adding in the range of 0.01% to 10%, preferably in the range of 0.05% to 2% of the associative thickener. All percentages being in volume percentages based on the total volume of the paint.

It should be understood that the actual drying time for a layer of the paint containing the coating composition of the present invention would be different than the dry time rating under ASTM D 1640 test, since actual drying time depends upon many factors, such as ambient temperature and layer thickness. The wet film thickness of the layer of the paint, depending on the intended use, generally varies in the range of from 0.025 mms (1 mil) to 0.75 mms (30 mils). When used as a metal coating it may vary in the range of from 0.025 mms (1 mil) to 0.25 mms (10 mils) and when used as a traffic marking it may vary in the range of from 0.25 mms (10 mils) to 0.75 mms (30 mils). Actual drying time of such a layer generally varies in the range of from 10 seconds to 30 minutes.

The associative thickener, sometimes also known as hydrophobe-modified water soluble polymer, used in the present invention can be any thickener or rheology modifier which contains at least two hydrophobic segments separated by hydrophilic segments. A hydrophobic segment is defined to be any organic moiety which, if the point(s) of attachment to the hydrophilic segments were replaced by bonds to hydrogen atoms, would have a solubility in water at 20° C. of less than 1 percent by weight based on the total weight of the hydrogenated hydrophobic segment. A hydrophilic segment is defined to be any organic moiety which, if the point(s) of attachment to the hydrophobic segments were replaced by bonds to hydrogen atoms, would have a solubility in water at 20° C. at some pH between 2 and 12 of greater than 5 percent by weight based on the total weight of the hydrogenated hydrophobic segment.

Examples of suitable associative thickener include the hydrophobic ethoxylated urethane resins (HEUR thickeners), which are generally the reaction products of polyethylene glycols with diisocyanates. Some of such associative thickeners are described in a commonly assigned U.S. Pat. No. 4,155,892. The HEUR thickeners are urethane polymers having at least three low molecular weight hydrophobic groups at least two of which are terminal (external) hydrophobic groups. Many of the polymers also contain one or more internal hydrophobic groups. The hydrophobic groups together contain a total of at least 20 carbon atoms and are linked through hydrophilic (water soluble) groups. The size of the hydrophobe size varies in the range of from 50 to 700 grams per mole, preferably in the range of from 100 to 500 grams per mole and most preferably in the range of from 200 to 350 grams per mole. The molecular weight of the thickener is such that it can readily solubilize in water, either by self-solubilization or through interaction with a known solubilizing agent, such as a water miscible alcohol or surfactant. The molecular weight of the thickener is in the range of from 5,000 to 200,000, preferably in the range of from 5,000 to 50,000, more preferably in the range of from 10,000 to 30,000 and most preferably in the range of from 15,000 to 20,000.

The HEUR polymers are prepared in non-aqueous media and are the reaction products of at least reactants (a) and (c) of the following reactants: (a) at least one water soluble polyether polyol, (b) at least one water insoluble organic polyisocyanate, (c) at least one monofinctional hydrophobic organic compound selected from monofunctional active hydrogen compounds and organic monoisocyanates, and (d) at least one polyhydric alcohol or polyhydric alcohol ether. The products formed include the following:

(1) Reaction products of a reactant (a) containing at least three hydroxyl groups, and the foregoing organic monoisocyanates;

(2) Reaction products of reactant (a), reactant (b) containing two isocyanate groups, and the foregoing active hydrogen containing compounds. Such compounds wherein the ratio of equivalents of (a) to (b) is 0.5:1 to 1:1;

(3) Reaction products of reactant (a), reactant (b) containing at least three isocyanate groups, and the active hydrogen containing compounds;

(4) Reaction products of reactant (a), reactant (b) and the organic monoisocyanates; and (5) Reaction products of reactants (a), (b), (d) and the organic monoisocyanates. The HEUR thickeners are preferred. One of the advantage of using the HEUR thickener is that a paint prepared therefrom does not have a strong odor, which is typically associated with high pH coating compositions.

Another type of associative thickener includes hydrophobized alkali soluble/swellable emulsions (HASE thickeners), which are generally copolymers of high levels of (meth)acrylic acid with hydrophobic monomers.

Yet another type of associative thickener is an acrylamide copolymer thickener, such as that described in the commonly assigned U.S. Pat. No. 4,395,524. Such a thickener is an aqueous solution of a water soluble, nonionic or anionic vinyl addition copolymer of, by weight, at least 50% acrylamide, 0.01 to 50%, an N-substituted acrylamide and, optionally up to 49.99% other vinyl monomers. The substituent on the nitrogen of acrylamide is hydrocarbyl and has 6 or more carbon atoms or is such a hydrocarbyl group attached to the nitrogen via a polyoxyalkylene chain. The GPC weight average molecular weight of the copolymer is greater than 30,000 but less than 2 million.

The polyacrylamide thickener is preferably a copolymer of acrylamide and one or more N-substituted acrylamides. In other embodiments, it is a copolymer of these amides and other vinyl monomers, preferably hydrophilic, such as hydroxypropyl acrylate, hydroxyethyl methacrylate, hydroxyethyl acrylate, methacrylic acid, acrylic acid, and especially, N-vinylpyrrolidone. Ionic acrylamide copolymers are made by copolymerization with ionizable monomers, preferably methacrylic acid, acrylic acid and itaconic acid. Nonionic copolymers are prepared employing N-vinylpyrrolidone or the hydroxyalkyl acrylates or methacrylates or hydroxy-, alkoxy-, or polyalkoxyalkyl acrylates and methacrylates, the preferred alkyl groups in these compounds having 2 to 4 carbon atoms and most preferably 2 or 3, i.e., being ethoxy or propoxy materials.

The acrylamide copolymer thickener is a product of free radical polymerization, preferably conducted in an atmosphere substantially free of oxygen and employing a free radical initiator at the usual levels, such as between 0.05 and 20 milliequivalents per 100 grams (meq/100 g) monomer. A chain transfer agent may be employed over a wide range of concentration with 0.05 to 20 meq/100 g dibasic acids, such as half esters, other alkyl and substituted alkyl amides of acrylic acid, methacrylic acid, maleic acid (mono- and di-amides), fumaric acid (mono- and di-amides), and itaconic acid (mono- and di-amides), methacrylamide, diacetone acrylamide, alkyl vinyl ethers, such as butyl vinyl ether, and ureido monomers, including those with cyclic ureido groups. Another variation on the inclusion of the hydrophilic monomer, for example, is when a monomer is included in the polymerization mix which is not itself hydrophilic, but is altered in processing or in a subsequent step, e.g., by hydrolysis, to provide hydrophilicity; anhydride- and epoxide-containing monomers are examples. Other examples are the esters of vinyl alcohol such as vinyl formate, vinyl acetate, vinyl propionate, vinyl butyrate, and vinyl versatate. Hydrolysis of these monomers produces vinyl alcohol mer units in the polymer which mer units are hydrophilic. The preferred monomer of these is vinyl acetate.

As stated earlier, the composition of the present invention includes the volatile water-soluble organic solvent. The level of volatile water-soluble organic solvent is such that a paint containing the composition can be easily sprayed by conventional spray techniques, such as air-atomized spray, airless spray, air-assisted airless spray, and high volume low pressure spray. As the volatile water-soluble organic solvent evaporates from a layer applied from a paint containing the composition of the present invention, the associative thickener present in the layer acts to substantially increase the viscosity, thereby accelerating the set-to-touch drying rate of the layer. Generally the viscosity, upon the evaporation of the solvent from the layer, increases at least by three times the in-can viscosity of the paint. Applicant has unexpectedly discovered that when the volatile water-soluble organic solvent in the range of from 0.2% to 10%, preferably in the range of from 1% to 10% and more preferably in the range of from 1% to 5%, all in volume percentages based on the total paint volume, is added to the composition, the foregoing unexpected results are achieved.

The volatile water soluble organic solvent suitable for use in the present invention includes any organic solvent which is soluble in water at 20° C. to at least 5 percent by weight of the total weight of the aqueous solution, and which has an evaporation rate equal to or greater than n-butyl alcohol. Examples of suitable solvents include, but are not restricted to, acetone, methyl acetate, tetrahydrofuran, ethyl acetate, methyl ethyl ketone, propylene glycol methyl ether, ethylene glycol methyl ether, methanol, ethanol, isopropanol, n-propanol, sec-butanol, isobutanol, t-butanol, n-butanol, ethyl acetate, propylene glycol monomethylether acetate, ethylene glycol monomethylether acetate, propylene glycol monomethylether, ethylene glycol monomethylether, and mixtures thereof. The preferred solvents are acetone and methanol. Acetone is more preferred.

The coating composition of the present invention further includes a latex binder, which may be a dispersed polymer having polymer particles dispersed in an aqueous evaporable carrier or it may either be a water soluble polymer, a water-reducible polymer, a mixture of the water soluble and water-reducible polymers in the aqueous evaporable carrier, or a mixture of the dispersed, water-reducible and water soluble polymers in the aqueous evaporable carrier. If desired the latex binder may include a mixture of a dispersed polymer with a water soluble or a water-reducible polymer. The latex binder in the form of a dispersed polymer particles is preferred, wherein the particle size of the dispersed polymer particles varies in the range of from 20 to 1000 nanometers, preferably in the range of from 30 to 300 nanometers, more preferably in the range of from 100 to 250 nanometers.

The latex polymer suitable for use in the present invention includes an emulsion polymer of mono- or polyethylenically unsaturated olefinic, vinyl or acrylic monomers, including homopolymers and copolymers of such monomers. Specifically, the dispersed polymer may include poly(vinyl acetate) and copolymers of vinyl acetate (preferably at least 50% by weight) with one or more of vinyl chloride, vinylidene chloride, styrene, vinyltoluene, acrylonitrile, methacrylonitrile, acrylamide, methacrylamide, maleic acid and esters thereof, or one or more of the acrylic and methacrylic acid esters mentioned in U.S. Pat. Nos. 2,795,564 and 3,356,627, which polymers are well-known as the film-forming component of aqueous base paints; homopolymers of $C_2$-$C_{40}$ alpha olefins such as ethylene, isobutylene, octene, nonene, and styrene; copolymers of one or more of these hydrocarbons with one or more esters, nitriles or amides of acrylic acid or of methacrylic acid or with vinyl esters, such as vinyl acetate and vinyl chloride, or with vinylidene chloride; and diene polymers, such as copolymers of butadiene with one or more of styrene, vinyl toluene, acylonitrile, methacrylonitrile, and esters of acrylic acid or methacrylic acid. It is also quite common to include a small amount, such as 0.5 to 2.5% or more, of an acid monomer in the monomer mixture used for making the copolymers mentioned above by emulsion polymerization. Acids used include acrylic, methacrylic, itaconic, citraconic, crotonic, maleic, fumaric, the dimer of methacrylic acid.

The vinyl acetate copolymers are well-known and include copolymers such as vinyl acetate/butyl acrylate/2-ethylhexyl acrylate, vinyl acetate/butyl maleate, vinyl acetate/ethylene, vinyl acetate/vinyl chloride/butyl acrylate and vinyl acetate/vinyl chloride/ethylene.

Other suitable monomers from which the latex binder may be polymerized from include at least one or more of the following monomers, such as, for example, acrylic and methacrylic ester monomers including methyl (meth)acrylate, ethyl (meth)acrylate, butyl (meth)acrylate, 2-ethylhexyl (meth)acrylate, decyl (meth)acrylate, lauryl (meth)acrylate, isobornyl (meth)acrylate, isodecyl (meth)acrylate, oleyl (meth)acrylate, palmityl (meth)acrylate, stearyl (meth)acrylate, hydroxyethyl (meth)acrylate, and hydroxypropyl (meth)acrylate; acid functional monomers, such as, acrylic acid, methacrylic acid, crotonic acid, itaconic acid, fumaric acid and maleic acid; monomethyl itaconate; monomethyl fumarate; monobutyl fumarate; maleic anhydride; acrylamide or substituted acrylamides; sodium vinyl sulfonate; phosphoethyl (meth)acrylate; acrylamido propane sulfonate; diacetone acrylamide; glycidyl methacrylate; acetoacetyl ethylmethacrylate; acrolein and methacrolein; dicyclopentadienyl methacrylate; dimethyl meta-isopropenyl benzyl isocyanate; isocyanato ethylmethacrylate; styrene or substituted styrenes; butadiene; ethylene; vinyl acetate or other vinyl esters, N-vinyl pyrrolidone; amino monomers, such as, for example, N,N'-dimethylamino and (meth)acrylate.

The polymerization techniques used for preparing the latex binder of the present invention are well known in the art. The binder may be prepared by emulsion or solution polymerization, preferably by free-radical initiation. The polymerization may be performed continuously or batchwise. Either thermal or redox initiation processes may be used.

The polymerization process is typically initiated by conventional free radical initiators, which include hydrogen peroxide; hydroperoxides, such as, t-butyl hydroperoxide; dialkyl peroxides, such as, di-t-butyl peroxide; peroxy esters, such as, t-butylperoxy pivalate; diacyl peroxides, such as, benzoyl peroxide; azo compounds, such as, 2–2'-azobisisobutyronitrile; and, ammonium and alkali persulfates, such as, sodium persulfate, typically at a level of 0.05 percent to 3.0 percent by weight, all weight percentages based on the total weight of the monomer mixture. Redox systems using the same initiators coupled with a suitable reductant such as, for example, sodium bisulfite, sodium hydrosulfite, sodium formaldehyde sulfoxylate and ascorbic acid, may be used at similar levels.

Chain transfer agents may be used in an amount effective to provide the desired GPC weight average molecular weight. For the purposes of regulating molecular weight of the latex binder being formed, suitable chain transfer agents include well known halo-organic compounds, such as, carbon tetrabromide and dibromodichloromethane; sulfur-containing compounds, such as, alkylthiols including ethanethiol, butanethiol, tert-butyl and ethyl mercaptoacetate, as well as aromatic thiols; or various other organic compounds having hydrogen atoms which are readily abstracted by free radicals during polymerization. Additional suitable chain transfer agents or ingredients include but are not limited to butyl mercaptopropionate; isooctylmercapto propionate; bromoform; bromotrichloromethane; carbon tetrachloride; alkyl mercaptans, such as, 1-dodecanthiol, tertiary-dodecyl mercaptan, octyl mercaptan, tetradecyl mercaptan, and hexadecyl mercaptan; alkyl thioglycolates, such as, butyl thioglycolate, isooctyl thioglycoate, and dodecyl thioglycolate; thioesters; or combinations thereof Mercaptans are preferred.

When the latex binder in the form of a dispersed polymer is utilized, the polymer particle size is controlled by the amount of conventional surfactants added during the emulsion polymerization process. Conventional surfactants include anionic, nonionic emulsifiers or their combination. Typical anionic emulsifiers include the salts of fatty rosin and naphthenic acids, condensation products of napthalene sulfonic acid and formaldehyde of low molecular weight, carboxylic polymers and copolymers of the appropriate hydrophile-lipophile balance, alkali or ammonium alkyl sulfates, alkyl sulfonic acids, alkyl phosphonic acids, fatty acids, and oxyethylated alkyl phenol sulfates and phosphates. Typical nonionic emulsifiers include alkylphenol ethoxylates, polyoxyethylenated alkyl alcohols, amine polyglycol condensates, modified polyethoxy adducts, long chain carboxylic acid esters, modified terminated alkylaryl ether, and alkylpolyether alcohols. Typical ranges for surfactants are between 0.1 to 6 percent by weight based on the total weight of the monomer mixture.

Alternatively, the latex binder may include multi-stage polymer particles having two or more phases of various geometric structures, such as, for example, core/shell or core/sheath particles, core/shell particles with shell phases incompletely encapsulating the core, core/shell particles with a multiplicity of cores and interpenetrating network particles. In all of these cases, the majority of the surface area of the particle will be occupied by at least one outer phase and the interior of the polymer particle will be occupied by at least one inner phase The outer phase of the multi-stage polymer particles weighs 5 weight percent to 95 weight percent based on the total weight of the particle. It is often desirable for each stage of the multi-stage polymer particles to have a different Tg. If desired, each stage of these multi-stage polymer particles may be provided with different GPC weight average molecular weight, such as, the multi-stage polymer particle composition disclosed in U.S. Pat. No. 4,916,171.

In addition, the coating composition suitable for use in the present invention may include standard formulation additives, such as coalescents, pigments, extenders, defoamers, surfactants, wetting agents, dispersants, waxes, slip aids, and crosslinkers. The coalescents, as used herein are those film forming agents that evaporate from an applied layer, substantially after the evaporation of the volatile water soluble organic solvent and water present in the applied layer.

The coating composition of the present invention is generally provided with a solids content in the range of from 50 percent to 85 percent, all in volume percentages based on the total volume of the composition.

The paint containing the coating composition of the present invention is generally provided with a pigment volume concentration in the range of from 40 percent to 70 percent, all in volume percentages based on the total volume of the paint.

If desired, the method of the present invention may include dropping glass beads on the layer of a traffic paint containing the coating composition of the present invention before the layer dries to ensure the adhesion of the glass beads to the layer applied to a road surface. Facially disposed glass beads on the traffic markings act as light reflectors. If glass beads are not used, the traffic markings would be difficult to see under night and wet weather conditions. Thus, almost all of the traffic markings are generally beaded, i.e., glass beads sprinkled and affixed on top of the coatings roughly at the rate of 0.72 to 2.9 kilograms or more per liter of paint for night and wet weather visibility. The glass beads are dropped by methods known in the art, such as, by spraying the glass beads entrained and conveyed by a jet of air and dropped atop the layer or by sprinkling the glass beads at a desired rate from a storage hopper positioned above the layer of the traffic paint. The glass beads are applied over the layer, while the layer is still in its "wet" state, i.e., before the layer dries up to form the traffic paint marking. The amount of glass beads dropped on the layer is dependent upon the size, refractive index, and surface treatment of the glass beads. The typical glass beads specified for traffic markings are described under AASHTO Designation M 247-81 (1993) developed by American Association of State Highway and Transportation Officials, Washington, D.C. Optionally, glass beads may be premixed with the traffic paint before it is applied to road surfaces.

The method of the present invention can be used to produce a quick drying coating useful as, a pavement or road marking traffic paint for concrete, asphalt or bituminous roads, walkways, or parking lots, a metal protection coating, a mastic for roofs or other building components, and a coating for masonry, wood, plastics, woven and nonwoven fabrics and fibers, glass, leather, or paper.

TEST PROCEDURES

The following test procedures were used for generating the data reported in Examples below:

Set-to-Touch Dry Test

This test was performed in accordance with ASTM Method D 1640. A layer having a wet film thickness of 0.305 mms (12 mil) from a test paint prepared in accordance with the present invention or a comparative paint, was drawn down on an aluminum panel. The layer was then periodically touched lightly with a finger. Set-to-Dry time was recorded when the layer no longer adhered to the finger.

In-can Paint Viscosity Measurement

In-can paint viscosities were measured by a Brookfield Model LVT Viscometer supplied by Brookfield Engineering Laboratories INC., Stoughton, Ma., using # 3 spindle @ 30 RPM.

EXAMPLES

Associative Thickener Preparation

Examples of associative thickeners ($T_1$ and $T_2$), shown in Table 1 below, were made by the following standard procedure:

A 100 ml 3-neck round bottom flask was outfitted with a reflux condenser connected to a drying tube filled with $CaSO_4$, a gas inlet tube, a serum cap, and a magnetic stirrer. The solid components (marked with * in Table 1 below) were placed into the flask, the system was flushed with dry nitrogen, the stirrer was turned on, and then the flask was warmed until the solid components melted. The liquid components were then injected into the flask via the serum cap in the order listed in Table 1 below, then the mixture was heated at reflux for 5 hours. Then 10 g of ethanol was added to the flask, and refluxing continued for an additional hour. The resulting solutions were poured into open glass jars and placed in a 160° F. oven for four days until all of the volatiles had been removed. The resulting solids were then dissolved in methanol to make 33.3 percent solutions by weight based on the total weight of the solution.

TABLE 1

| Thickener # | $T_1$ | $T_2$ |
| --- | --- | --- |
| poly(ethylene glycol)[1] $M_n$ = 4600* | 20.00 g | |
| poly(ethylene glycol)[2] $M_n$ = 8000* | | 20.00 g |
| octanol | 0.57 g | 0.33 g |
| ethylene glycol | 0.14 g | 0.08 g |
| methyl ethyl ketone | 4.00 g | 4.00 g |
| isophorone diisocyanate | 1.94 g | 1.12 g |
| T-12 (1% solution in propylene glycol methyl ether acetate) | 0.07 g | 0.07 g |
| methyl ethyl ketone | 8.00 g | 8.00 g |

[1]supplied by Aldrich Chemical Company, Milwaukee, Wisconsin
[2]supplied by Aldrich Chemical Company, Milwaukee, Wisconsin
$M_n$ means number average molecular weight
*these were solid components

Paint Preparation

The following Master Batches were prepared by mixing together the ingredients listed below in Table 2 in the order shown:

TABLE 2

| Master Batches # | $B_2$ | $B_1$ |
|---|---|---|
| Emulsion polymer[1] | 302.2 g | 3802.5 g |
| water | 56.8 g | 568.5 g |
| Dispersant[2] | 7.2 g | 72.0 g |
| Defoamer[3] | 2.0 g | 20.0 g |
| Pigment[4] | 100.0 g | 1000.0 g |
| Extender[5] | 760.6 g | 7606.0 g |
| Coalescing agent*[6] | | 230.0 g |
| water* | | 230.0 g |
| Surfactant*[7] | | 1.0 g |

[1]Rhoplex ® TP-257 emulsion polymer supplied by Rohm and Haas Company, Philadelphia, Pennsylvania
[2]Tamol ® 901 Dispersant @ 30 percent based on the solids supplied by Rohm and Haas Company, Philadelphia, Pennsylvania
[3]Drewplus ® L-493 Defoamer supplied by Drew Chemical Company, Boonton, New Jersey
[4]TiPure ® R-900 titanium dioxide white pigment supplied by E. I. duPont de Nemours & Company, Wilmington, Delaware
[5]Omyacarb ®-5 Ground natural calcium carbonate, evaluated under ASTM D 1199, Type GC, Grade II having a number average particle size of 5.5 microns with maximum oil absorption No. of 10, supplied by Omya, Inc., Proctor, Vermont
[6]Texanol ® Ester alcohol supplied by Eastman Chemicals, Kingsport, Tennessee
[7]Triton ® X-405 Octyl phenoxy polyethoxyethanol Surfactant supplied by Union Carbide Chemicals, Inc., Danbury, Connecticut @ 70 percent solids by weights
*these ingredients were premixed The following test paints $P_1$ through $P_4$ and $P_5$ and comparative test paints $CP_1$ through $CP_5$ were prepared by mixing together the ingredients listed below in the order shown. The amount of thickener added was adjusted to achieve the viscosity listed in Table 4 later.

TABLE 3

| | Master Batch | Solvent* | water* | Thickener |
|---|---|---|---|---|
| $P_1$ | 654.8 g ($B_1$) | 5.55 g[1] | 14.54 g | $T_1$ |
| $P_2$ | 730.8 g ($B_1$) | 12.40 g[1] | 10.01 g | $T_1$ |
| $P_3$ | 705.3 g ($B_1$) | 5.98 g[1] | 15.65 g | $T_2$ |
| $P_4$ | 685.8 g ($B_1$) | 11.63 g[1] | 9.40 g | $T_2$ |
| $CP_1$ | 676.0 g ($B_1$) | 11.47 g[2] | 9.26 g | Associative Thickener[4] |
| $P_5$ | 200.0 g ($B_2$) | 6.0 g[1] | 7.0 g | $T_2$ |
| $CP_2$ | 200.0 g ($B_2$) | 6.0 g[1] | 7.0 g | |
| $CP_3$ | 200.0 g ($B_2$) | 6.0 g[3] | 7.0 g | $T_2$ |
| $CP_4$ | 200.0 g ($B_2$) | | 13.0 g | $T_2$ |
| $CP_5$ | 200.0 g ($B_2$) | 6.0 g[1] | 7.0 g | Non-Assoc. Thickener[5] |

[1]acetone
[2]diethylene glycol butyl ether
[3]ethylene glycol butyl ether
[4]Acrysol ® RM-825 Associative thickener supplied by Rohm and Haas Company, Philadelphia, Pennsylvania
[5]Acrysol ® ASE-60 Non-associative thickener supplied by Rohm and Haas Company, Philadelphia, Pennsylvania
*these ingredients were premixed The highest amount VOC in the test paints was in $P_2$ at 86 grams per liter of paint and the lowest amount was in $P_5$ at 80 grams per liter of paint. Thus, all the test paints were well within the proposed upper limit for VOC in paint. For proper comparison, the comparative paints also had VOC in similar amounts.

TABLE 4

| Paint # | Solvent level (% on resin solids) | Thickener | viscosity (cps) | Set to Touch time (min.) |
|---|---|---|---|---|
| $P_1$ | 5[1] | $T_1$ | 2520 | 7.25 |
| $P_2$ | 10[1] | $T_1$ | 2840 | 2.25 |
| $P_3$ | 5[1] | $T_2$ | 2520 | 6 |
| $P_4$ | 10[1] | $T_2$ | 2320 | 2 |
| $CP_1$ | 10[2] | Associative Thickener[3] | 2400 | 11 |
| $P_5$ | 10[1] | $T_2$ | 1500 | 3.5 |
| $CP_2$ | 10[1] | No Thickener | 1230 | 22 |
| $CP_3$ | 10[2] | $T_2$ | 1400 | 12.5 |
| $CP_4$ | No solvent | $T_2$ | 1460 | 14 |
| $CP_5$ | 10[1] | Non-Assoc. Thickener[4] | 1660 | 14 |

[1]Solvent having high volatility
[2]Solvent having low volatility
[3]Acrysol ® RM-825 Associative thickener supplied by Rohm and Haas Company, Philadelphia, Pennsylvania
[4]Acrysol ® ASE-60 Non-associative thickener supplied by Rohm and Haas Company, Philadelphia, Pennsylvania Table 4 above, shows the set-to-touch dry times in minutes obtained from various composition having substantially the same viscosity (The first set of $P_1$–$P_4$ and $CP_1$ and the second set of $P_5$, $CP_2$–$CP_5$). From the test results shown in Table 4, it can be seen that as the amount of solvent added to the paint is increased ($P_1$ versus $P_2$ and $P_3$ versus $P_4$), set-to-dry time is substantially reduced. However, due to environmental limitation, there is a limit to how much solvent can be added to the composition.

Furthermore, Table 4 also shows that when an associative thickener ($P_5$) is substituted with non-associative thickener ($CP_5$) in the composition, there is substantial increase in the set-touch-dry time. Similarly, when no associative thickener was used ($CP_2$), or when low volatility solvent was used ($CP_3$), or when no solvent was used ($CP_4$) the set-to-touch dry time was significantly higher than the paint which contained the associative thickener and high volatility water soluble organic solvent was included in amounts disclosed earlier ($P_5$). Thus, it is seen that applicant has unexpectedly discovered that by including a certain desired level of associative thickener and high volatility water soluble organic solvent in the coating composition, a single pack low VOC paint, which can be applied easily by convention means, such as single spray head, and which has fast dry characteristic, was obtained.

What is claimed is:

1. A single pack fast dry paint comprising a low VOC waterborne coat composition, said composition comprising:
   a latex binder;
   an associative thickener; and
   a water soluble organic volatile solvent,
   wherein the amounts said associave thickener snd said solvent are such that a single pack fast dry paint containing said composition has an in-can visoity under ambient condition in the range of from 1,000 cps to 6,000 cps and a set-to-touch dry time under ASTM D-1640 of less tban 10 minutes.

2. The paint of claim 1, wherein said thickener is selected from the group consisting of HEUR, HASE, acrylamide copolyner, and mixtures thereof.

3. The paint of claim 1, wherein said solvent is selected from the group consisting of acetone, methyl acetate, tetrahydrofuran, ethyl acetate, methyl ethyl ketone, propylene glycol methyl ether, ethylene glycol methyl ether, methanol, ethanol, isopropanol n-propanol, sec-butanol, isobutanol, n-butanol, and mixtures thereof.

4. The paint of claim 1, wherein said associative thickener is present in the amount of 0.01% to 10% by volume, based on the total volume of said composition.

5. The paint of claim 1, wherein said water soluble organic volatile solvent is present in the amount of 0.2% to 10 % by volume, based on the total volume of said composition.

6. The paint of claim 1, wherein pigment volume concentation of said paint is 40% to 70%, all in volume percentages based on the total volume of said paint.

7. The paint of claim 1, wherein said composition has a solids content of 50% to 85%, all in volume peercentages based on the total volume of said composition.

8. The paint of claim 1, wherein single pack fast dry paint is a traffic marking paint.

9. A coating prepared by a method comprising:

applying under ambient conditions on a surface of a substrate said single pack fst dry paint of claim 9 to form a layer on said substrate; and evaporating said solvent from said layer to form said coating on said substrate.

10. The coating of claim 9, where said solvent from said layer is evaporated in 10 seconds to 30 minutes under high humidity conditions.

11. The coating of claim 9, where said coating is a taffic marking coating.

* * * * *